Nov. 7, 1961   M. A. DERR, JR   3,007,665
WALER BRACKET
Filed Dec. 22, 1959   2 Sheets-Sheet 1

Millard A. Derr, Jr.
INVENTOR.

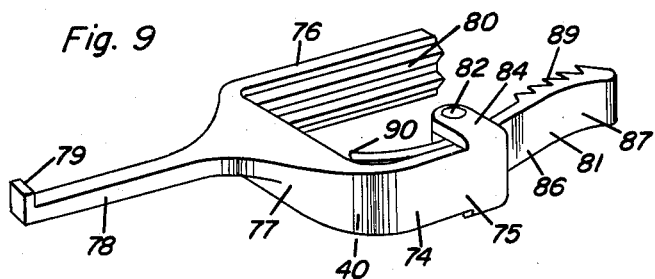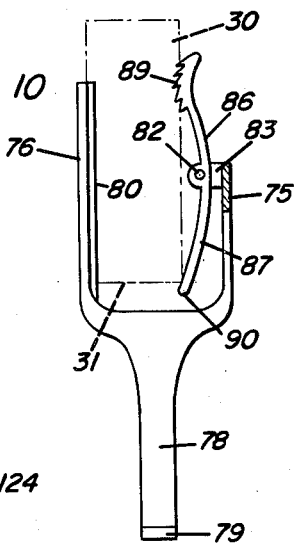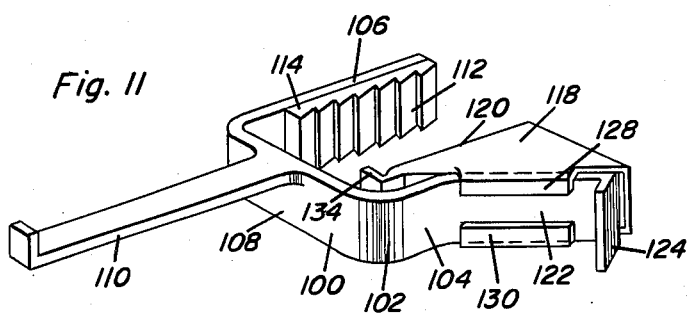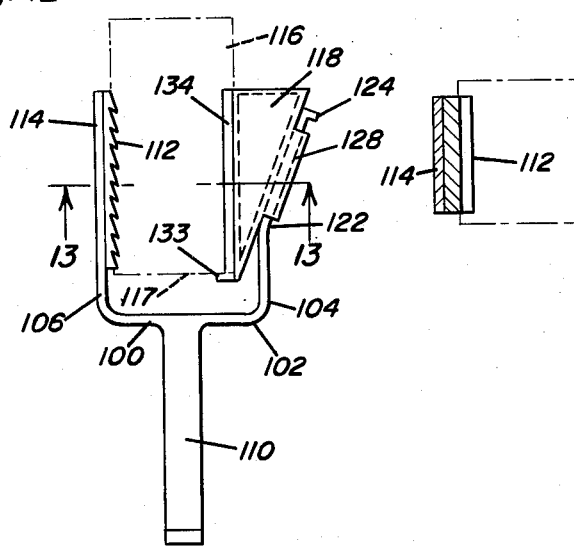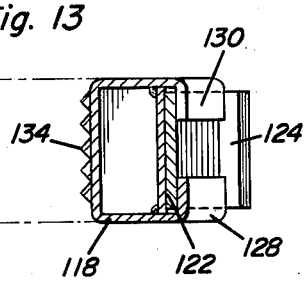

United States Patent Office 3,007,665
Patented Nov. 7, 1961

3,007,665
WALER BRACKET
Millard A. Derr, 3140 Jo Ann Drive, El Sobrante, Calif.
Filed Dec. 22, 1959, Ser. No. 861,405
11 Claims. (Cl. 248—226)

This invention relates to supports and more particularly to waler brackets.

An object of the invention is to provide improvements in waler brackets centering about greater utility, ease of movement, strength of construction, and facility in use.

Briefly, waler brackets in accordance with the invention employ a wedge action to hold the waler bracket secured to a stud or other structural member. In application of the waler bracket it is necessary only to slide the waler bracket in place and it automatically becomes locked. In certain forms of the invention the additional step of securing the wedge action is required. When the bracket has been applied securely it is held in place with tenacious force making it very safe and secure.

The principles of the invention are capable of being embodied in numerous forms of waler brackets. Some forms are more practical than others when considering the waler brackets in a general light. Other forms which may not be in a general way as practical as some, may be preferred as a matter of personal choice by some users. However, in each form of the invention a wedge action is preferred in that a wedge or wedge surface has great holding power and is quite easily released when force is applied, for instance by a hammer blow, in a proper direction.

The waler bracket has a basic application. Ordinarily waler brackets are used for temporarily holding a form waler in place during the erection of the forms before the permanent form ties can be fastened in place to hold the walers in position. Often in construction it is customary for the walers to be used in pairs with the form tie extending between the doubled walers. The waler brackets in accordance with the invention will eliminate the need for the temporary cleats used in construction practice at this time. The cleats are presently nailed to the studs in such a way that they protrude from the face of the stud so as to support the walers. This is made possible by the construction of the waler brackets enabling them to be promptly and efficiently installed. There are other possible uses of waler brackets, only some of which will be mentioned in detail subsequently.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 9 is a perspective view of the waler bracket shown in FIGURES 7 and 8.

FIGURE 10 is a top elevational view of the waler bracket in FIGURE 9 showing a stud in place therein in dotted lines.

FIGURE 11 is a perspective view of a further form of waler bracket.

FIGURE 12 is a top elevational view of the waler bracket in FIGURE 11.

FIGURE 13 is a cross-sectional view taken on the line 13—13 of FIGURE 12.

Figure 1:
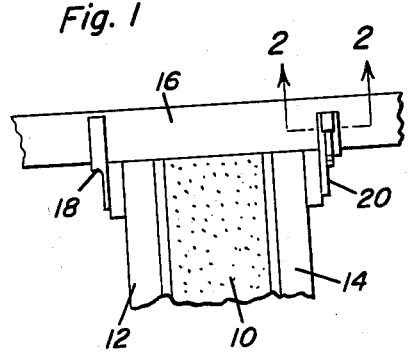
FIGURE 1 is a top view of a typical use of a pair of waler brackets in accordance with the invention.
Figure 4:
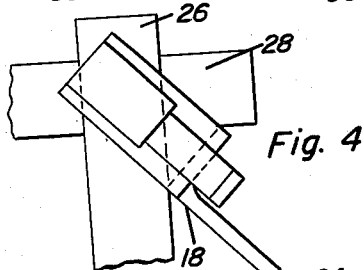
FIGURE 4 is a top diagrammatic view showing the use of the waler bracket in form work where it is often necessary to temporarily join two pieces of wood and later separate them.
Figure 7:
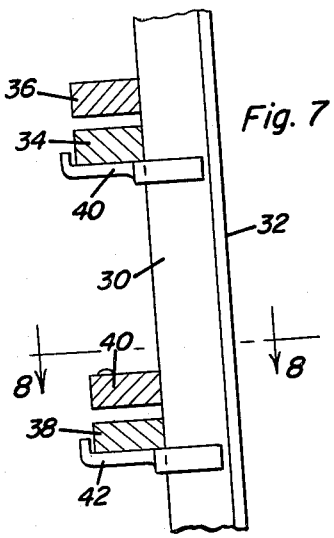
FIGURE 7 is a side elevational view showing a modified form of waler bracket in use.
Figure 8:
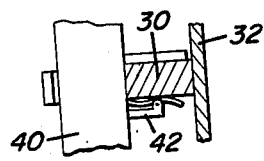
FIGURE 8 is a cross-sectional view taken on the line 8—8 of FIGURE 7.

In the accompanying drawings reference is first made to FIGURES 1, 4 and 7. FIGURE 1 shows wall 10 with wooden forms 12 and 14 on opposite sides thereof, and a wooden beam 16 at the top of the wall. Waler brackets 18 and 20 are shown connected between the forms 12 and 14 and beam 16. The details of the waler brackets 18 and 20 will be discussed subsequently. The purpose of FIGURE 1 is to show one possible, although not exclusionary use of waler brackets 18 and 20.

FIGURE 4 shows waler bracket 18 used to temporarily connect crossed wooden member 26 and 28 by engagement with the top and bottom surfaces of the upper and lower (or front and rear if members 26 and 28 are vertical) members 26 and 28. Here again, FIGURE 4 merely shows a possib'e use of the waler bracket.

FIGURE 7 is an illustration showing a common use of waler brackets. Stud 30 is mounted vertically and has form sheathing 32 on one face thereof. The walers 34, 36 and 38, 40 are often used in pairs, therefore pairs of walers are illustrated. These are held supported by waler brackets 40 and 42 engaged with stud 30 and supporting the walers. In this particular use, the waler brackets eliminate the need for temporary cleats used in construction practice at this time, for the purpose of protruding from the face of the stud so as to support the walers. This particular use was mentioned herein previously.

Referring now to the specific construction of waler bracket 20, attention is invited principally to FIGURES 1-6. The waler bracket 20 is made of an essentially U-shaped member 48 having parallel sides 50 and 52 together with a connecting member formed of a flat plate 54 at one pair of ends of sides 50 and 52. The inner face of side 50 has serrations 56 on a raised portion 58 thereof. The serrations are preferably in the form of teeth to grip into the substance of the stud 16 or other wooden member with which the waler bracket is connected.

Waler support arm 60 is fixed to plate 54 adjacent to one edge thereof, and it is in a plane perpendicular to the plane of plate 54. The arm 60 forms an appendage to serve as a structural support or handle or as an abutment depending on how the waler bracket is used.

Figure 2:
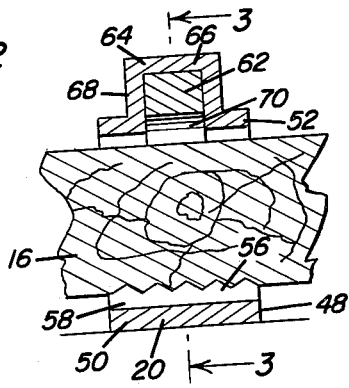
FIGURE 2 is a sectional view on an enlarged scale and taken on a line 2—2 of FIGURE 1.
Figure 3:
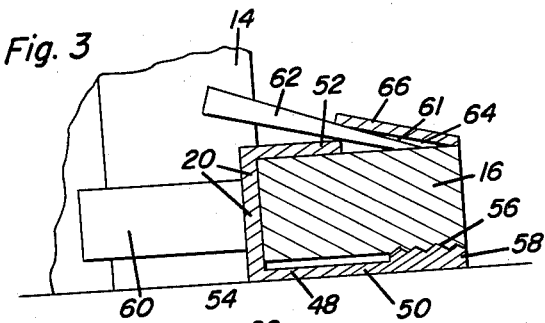
FIGURE 3 is a sectional view taken on the line 3—3 of FIGURE 2.
Figure 5:
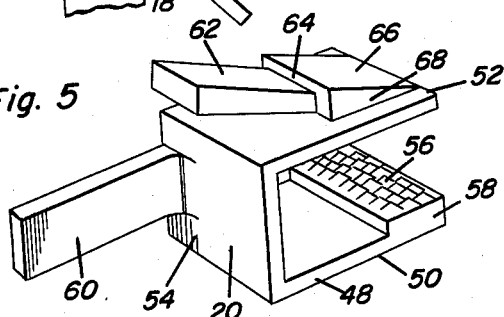
FIGURE 5 is a perspective view of the waler bracket in FIGURES 1-4 inclusive.

The means for engaging the clamp with the waler or other wooden member is seen best in FIGURES 2, 3 and 5. This means consists of a wedge 62, preferably made of metal, and a wedge guide 61. The wedge guide is constructed of a pocket formed with an outer wall 66 and two wedge-shaped side walls 68 which span an opening 70 formed in side 52. Wall 66 is angularly inclined with respect to the plane of side 52 so that when the wedge 62 is driven into pocket 64, the wedge is directed angularly against one of the sides of the waler or other structural member. This wedge action forces the waler or other wooden member into engagement with serrations 56 so that they bite into the member 16.

Figure 6:
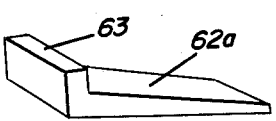
FIGURE 6 is a perspective view of a modified form of wedge used in the waler bracket.

Attention is now invited to FIGURE 6 showing a modification. The modification consists of wedge 62a which may replace wedge 62. It distinguishes by having a flange 63 at the wider end thereof to provide a hammering surface for both driving the wedge into the pocket 64 and for driving the wedge out of the pocket 64 by hammer blows or a single hammer blow.

FIGURES 7–10 disclose waler brackets 40 and 42. Since both brackets are identical, waler bracket 40 is shown in detail in FIGURES 9 and 10. It has a U-shaped clamp 74 provided with sides 75 and 76 together with a connecting member, preferably in the form of a plate 77 integral with one pair of ends of sides 75 and 76. Arm 78 which corresponds in function to arm 60, is formed integral with plate 77 and protrudes therefrom at right angles to the approximate plane of plate 77. There is a laterally projecting lip 79 at the outer extremity of arm 78 to form a stop or abutment as shown in use in FIGURES 7 and 8.

The action on a structural member, for example stud 30 is a wedge action. One face of side 76 has serrations 80 thereon, for instance elongate teeth, and the other side has a wedge action producing device 81 connected therewith. The basic purpose of the elongated serrations 80 (and 134 mentioned later) is to prevent the waler bracket from being twisted off the stud by a force applied parallel to the axis of the stud. The connection is pivotal by means of pin 82 which extends through apertures in a pair of ears 83 and 84 that protrude laterally inwardly from side 75. The ears 83 and 84 are parallel and form a nest therebetween within which the intermediate part of wedge 86 is disposed. The wedge is in the form of a curved arm 87 having an inner end disposed between sides 75 and 76 and having an outer end provided with serrations, for instance teeth 89 adapted to grip into the substance of the stud 30 or the like.

In use of waler bracket 40, it is simply pushed onto stud 30 or conceivably the stud slipped into the space between sides 75 and 76. The other uses shown in FIGURES 1 and 4 are fully capable of performance by the waler bracket, and there are numerous other possible uses which will occur to those familiar with the construction business.

Assume that the waler bracket is pushed or hammered onto stud 30, the edge 31 of the stud is capable of entering the space between sides 75 and 76 until edge 31 strikes the end 90 of wedge 86. At this time the wedge starts to pivot, wedging against the side face of stud 30. The serrations 89 bite into the material of stud 30, and the harder the waler bracket is hammered or pushed in the same direction, the greater the holding power of the wedge 86 which has its serrations 89 biting into the stud 30 and at the same time forcing the stud against serrations 80. Due to the three-point or area contact made with stud 30 i.e. at serrations 80 and 89 and at end 90 of the waler bracket, this particular form of the invention is thought to be most practical for most applications. Removal of the bracket is achieved by one or more hammer blows causing it to turn and pull off of the stud 30.

Attention is now invited to waler bracket 100 shown in FIGURES 11–13. This bracket is made of an essentially U-shaped clamp 102 having sides 104 and 106 connected integrally together at one pair of ends thereof by means of a connecting member, preferably in the form of a plate 108. Arm 110 identical in function and practically identical in construction to arm 78, is attached at right angles to plate 108 and protrudes therefrom.

There are serrations 112, for instance wedge-shaped teeth extending transversely across a raised part 114 of the inner face of side 106, and these are adapted to grip a typical workpiece, for instance stud 116 (FIGURE 12). Elongate serrations 134 are on the inner face of the opposite side of the bracket. The wedged action is obtained by means of wedge 118 which is slidably disposed on side 104. The wedge 118 is essentially triangular and may be of either solid or hollow construction. In order to have face 120 of wedge 118 move in planes approximately parallel to side 106, the outer extremity 122 of side 104 is angled outwardly with respect to the plane of side 106. A lateral flange 124 at the terminus of extremity 122 constitutes a stop to limit the outward movement of wedge 118.

The structure which slidingly connects wedge 118 with side 104, is quite simple, consisting of two angular members 128 and 130 at edges of the hypotenuse portion of the wedge. These embrace the edge portions of the angulated part of side 104 and form a guideway both connecting wedge 118 to side 104 and constraining the movement of wedge 118. A seat 133 for stud 116 is attached to wedge 118. The seat 133 consists of a flange extending inwardly of the face 120 of wedge 118.

In use of waler bracket 100, the bracket is simply pushed or forcibly moved, as by hammer blows, onto stud 116. When the inner face 117 of stud 116 seats upon seat 133, the wedge 118 slides on the angulated part of side 104 whereby it moves inwardly toward side 106 exerting a wedge action on one of the side faces of stud 116. This causes the serrations 112 and 134 to grip into the material of the stud 116 and create a very effective holding action.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A waler bracket comprising an essentially U-shaped clamp having a first side and a second side, a connecting member fixed to one pair of ends of said sides, an arm protruding from said connecting member, and wedge means operatively associated with one of said sides for engaging a member between said first and second sides, and serrations connected with at least one of said sides for gripping into the material of the member between said first and second sides, said wedge means comprise a curved arm, means including a pivot connecting said curved arm to said first side intermediate the end of said curved arm, one extremity of said curved arm constituting an abutment against which the inner part of the member between said sides is adapted to abut to turn the wedge, and the opposite end of said curved arm having means thereon to grip against a portion of the member between said first and second sides.

2. A waler bracket comprising an essentially U-shaped clamp having a first side and a second side, a connecting member fixed to one pair of ends of said sides, an arm protruding from said connecting member, and wedge means operatively associated with one of said sides for engaging a member between said first and second sides, and serrations connected with at least one of said sides for gripping into the material of the member between said first and second sides, said wedge means include a wedge, said second side having a pocket provided with an angulated wall, said second side having an aperture registered with said pocket, and said wedge insertable in said pocket and through said aperture to engage a face of the member inserted between said first and second sides.

3. A waler bracket comprising an essentially U-shaped clamp having a first side and a second side, a connecting member fixed to one pair of ends of said sides, an arm protruding from said connecting member, and wedge means operatively associated with one of said sides for engaging a member between said first and second sides, and serrations connected with at least one of said sides for gripping into the material of the member between first and second sides, said wedge means include a wedge, said first side having an angulated end, means slidably connecting said wedge on said angulated end and constraining the movement of said wedge, a seat connected with said wedge and disposed between said first and second sides and adapted to be contacted by the member between said first and second sides to move said wedge slidingly on said angulated end of said first side and inwardly toward said second side.

4. The subject matter of claim 3 wherein there is a stop connected with said angulated part of said second side to prevent the wedge from separating from said second side.

5. In a waler bracket, a clamp which is substantially U-shaped and which has a first and second side with said first side shorter than said second side, a wedge composed of an arm pivoted between the ends thereof and to said first side adjacent to the outer end thereof, said arm having an inner extremity adapted to be engaged by a member between said first and second sides thereby pivotally actuating said arm, and the opposite end of said arm adapted to grip against the member when said arm is pivotally actuated.

6. In a waler bracket, a clamp which is substantially U-shaped and which has a first and second side with said first side shorter than said second side, a wedge composed of an arm pivoted between the ends thereof and to said first side adjacent to the outer end thereof, said arm having an inner extremity adapted to be engaged by a member between said first and second sides thereby pivotally actuating said arm, and the opposite end of said arm adapted to grip against the member when said arm is pivotally actuated, said outer end of said arm having serrations thereon.

7. The subject matter of claim 6 wherein said second side has serrations thereon to grip against the member between said first and second sides.

8. The subject matter of claim 7 wherein there are means rigidly secured to said first side and projecting inwardly toward said second side, a pivot attached to the last mentioned means and cooperating therewith to support said arm for pivotal movement.

9. The subject matter of claim 7 wherein there is a support arm protruding from said U-shaped clamp.

10. The subject matter of claim 9 wherein there is a stop at the outer end of said arm.

11. A waler bracket comprising an essentially U-shaped clamp having a first side and a second side, a connecting member fixed to one pair of ends of said sides, an arm protruding from said connecting member, and wedge means operatively associated with one of said sides for engaging a member between said first and second sides, and serrations connected with at least one of said sides for gripping into the material of the member between said first and second sides, wherein said serrations are elongate to prevent the bracket from being twisted off the member by a force applied parallel to the axis of the member.

References Cited in the file of this patent

UNITED STATES PATENTS

| | | |
|---|---|---|
| 1,162,182 | Mayer | Nov. 30, 1915 |
| 1,332,442 | Kane | Mar. 2, 1920 |
| 1,629,899 | Wustholz | May 24, 1927 |
| 2,791,818 | Hillberg | May 14, 1957 |
| 2,866,249 | Normandin | Dec. 30, 1958 |

FOREIGN PATENTS

| | | |
|---|---|---|
| 452,869 | Canada | Nov. 23, 1948 |